(12) United States Patent  
Linares

(10) Patent No.: US 8,813,660 B2  
(45) Date of Patent: Aug. 26, 2014

(54) PALLET CONSTRUCTION WITH MULTI SURFACE BONDING PLASTICIZED SPRAY

(76) Inventor: Miguel A. Linares, Bloomfield Hills, MI (US)

(*) Notice: Subject to any disclaimer, the term of this patent is extended or adjusted under 35 U.S.C. 154(b) by 0 days.

(21) Appl. No.: 13/432,985

(22) Filed: Mar. 28, 2012

(65) Prior Publication Data

US 2012/0260832 A1 Oct. 18, 2012

Related U.S. Application Data

(60) Provisional application No. 61/474,772, filed on Apr. 13, 2011.

(51) Int. Cl.  
*B65D 19/38* (2006.01)  
*B65D 19/00* (2006.01)

(52) U.S. Cl.  
CPC .. *B65D 19/0095* (2013.01); *B65D 2519/00333* (2013.01); *B65D 2519/00044* (2013.01); *B65D 2519/00064* (2013.01); *B65D 2519/00069* (2013.01); *B65D 2519/00074* (2013.01); *B65D 2519/00024* (2013.01); *B65D 2519/00562* (2013.01); *B65D 2519/00089* (2013.01); *B65D 2519/00323* (2013.01); *B65D 2519/00019* (2013.01); *B65D 2519/00059* (2013.01); *B65D 2519/00572* (2013.01); *B65D 2519/00094* (2013.01); *B65D 2519/00079* (2013.01); *B65D 2519/00029* (2013.01); *B65D 2519/00273* (2013.01); *B65D 2519/00104* (2013.01); *B65D 2519/00567* (2013.01); *B65D 2519/00039* (2013.01); *B65D 2519/0086* (2013.01); *B65D 2519/00054* (2013.01); *B65D 2519/00099* (2013.01); *B65D 2519/00034* (2013.01); *B65D 2519/00278* (2013.01); *B65D 2519/00109* (2013.01); *B65D 2519/00114* (2013.01); *B65D 2519/00293* (2013.01)  
USPC ...................................... 108/57.25

(58) Field of Classification Search  
USPC ....................... 108/51.11, 51.3, 57.17–57.19, 108/57.25–57.28  
See application file for complete search history.

(56) References Cited

U.S. PATENT DOCUMENTS

| | | | | |
|---|---|---|---|---|
| 2,597,411 | A * | 5/1952 | Vankrimpen | 108/57.1 |
| 3,616,766 | A * | 11/1971 | Weiss | 8/57.18 |
| 4,283,890 | A * | 8/1981 | Takeda et al. | 52/143 |
| 5,367,960 | A * | 11/1994 | Schleicher | 108/57.32 |
| 5,487,345 | A * | 1/1996 | Winebarger et al. | 108/51.3 |
| 8,146,516 | B2 | 4/2012 | Linares | |
| 8,167,605 | B2 | 5/2012 | Linares | |
| 8,176,869 | B2 | 5/2012 | Linares | |
| 8,196,527 | B2 | 6/2012 | Linares | |
| 2009/0246461 | A1 * | 10/2009 | Linares | 428/138 |
| 2011/0179977 | A1 | 7/2011 | Linares | |

FOREIGN PATENT DOCUMENTS

WO 2012137006 A2 10/2012

* cited by examiner

*Primary Examiner* — Matthew Ing  
(74) *Attorney, Agent, or Firm* — Gifford, Krass, Sprinkle, Anderson & Citkowski, P.C.; Douglas J. McEvoy

(57) ABSTRACT

A pallet construction including a plurality of elongate extending and inter-engaging members establishing three dimensional construction with an upper platform supporting surface and a spaced apart and bottom ground supporting surface. A plasticized and environmentally sealing spray overcoat is applied over the members. Additional variants include a plurality of three dimensional and rectangular shaped support elements sandwiched between a first upper plurality of elongated members and a second plurality of lower members. A plurality of inter-engaging and overlapping locations include at least one of reduced thickness or notched locations in order to assemble into a seamless and constant width manner. The members can further exhibit any specified shape and size and can be constructed of any of a wood, steel, aluminum, bamboo, composite plastic, cardboard, foam or concrete/silicate based material.

5 Claims, 14 Drawing Sheets

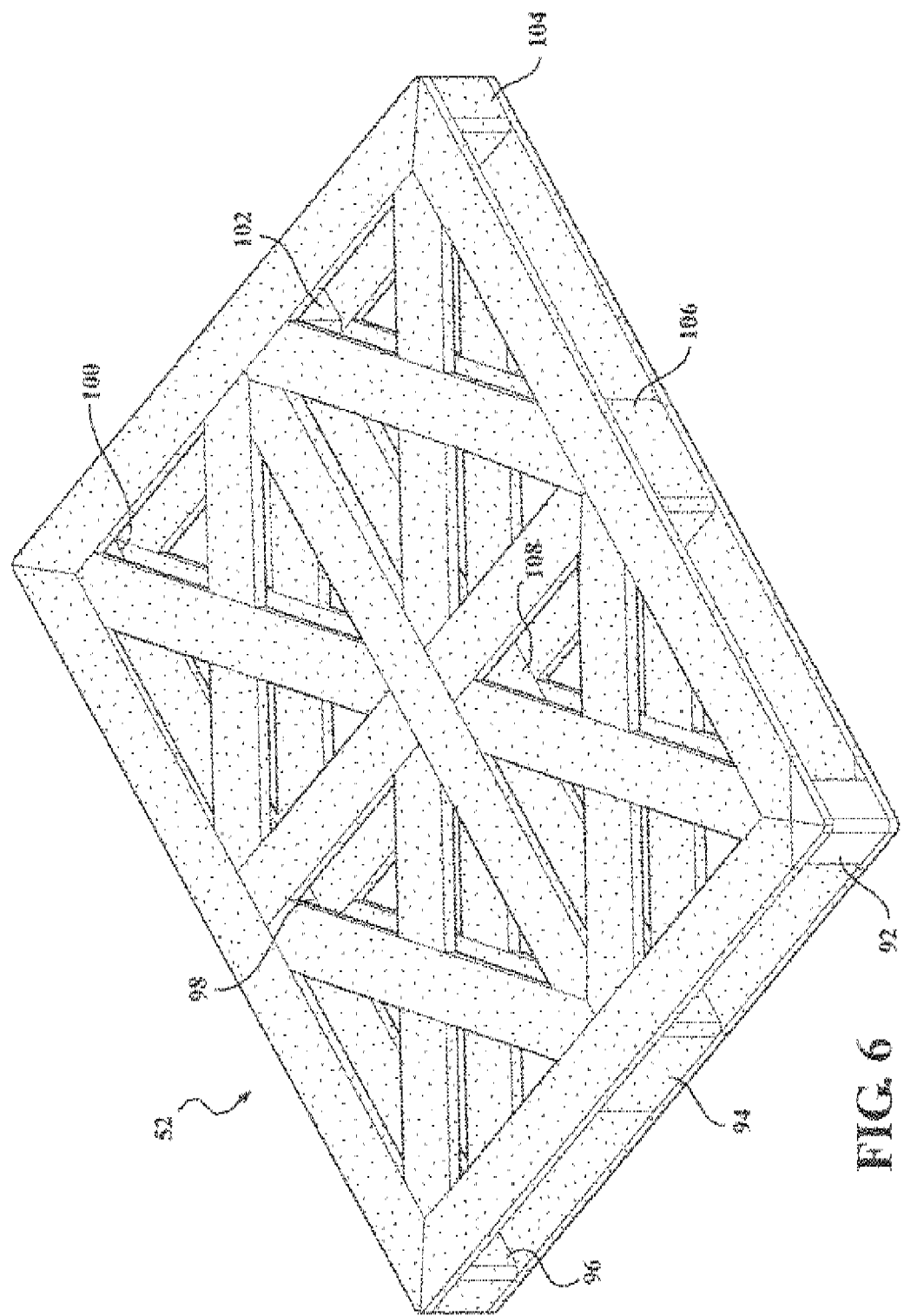

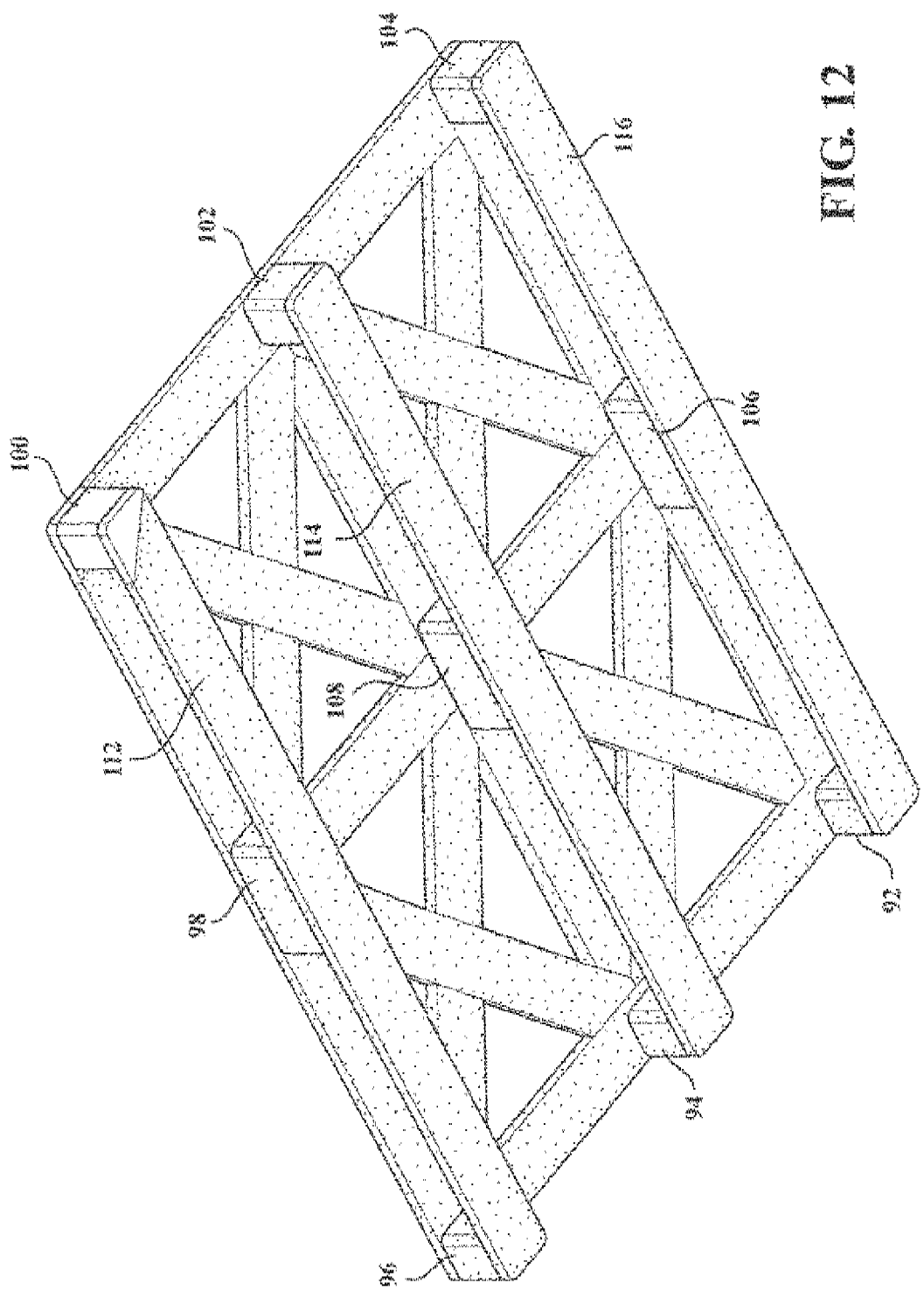

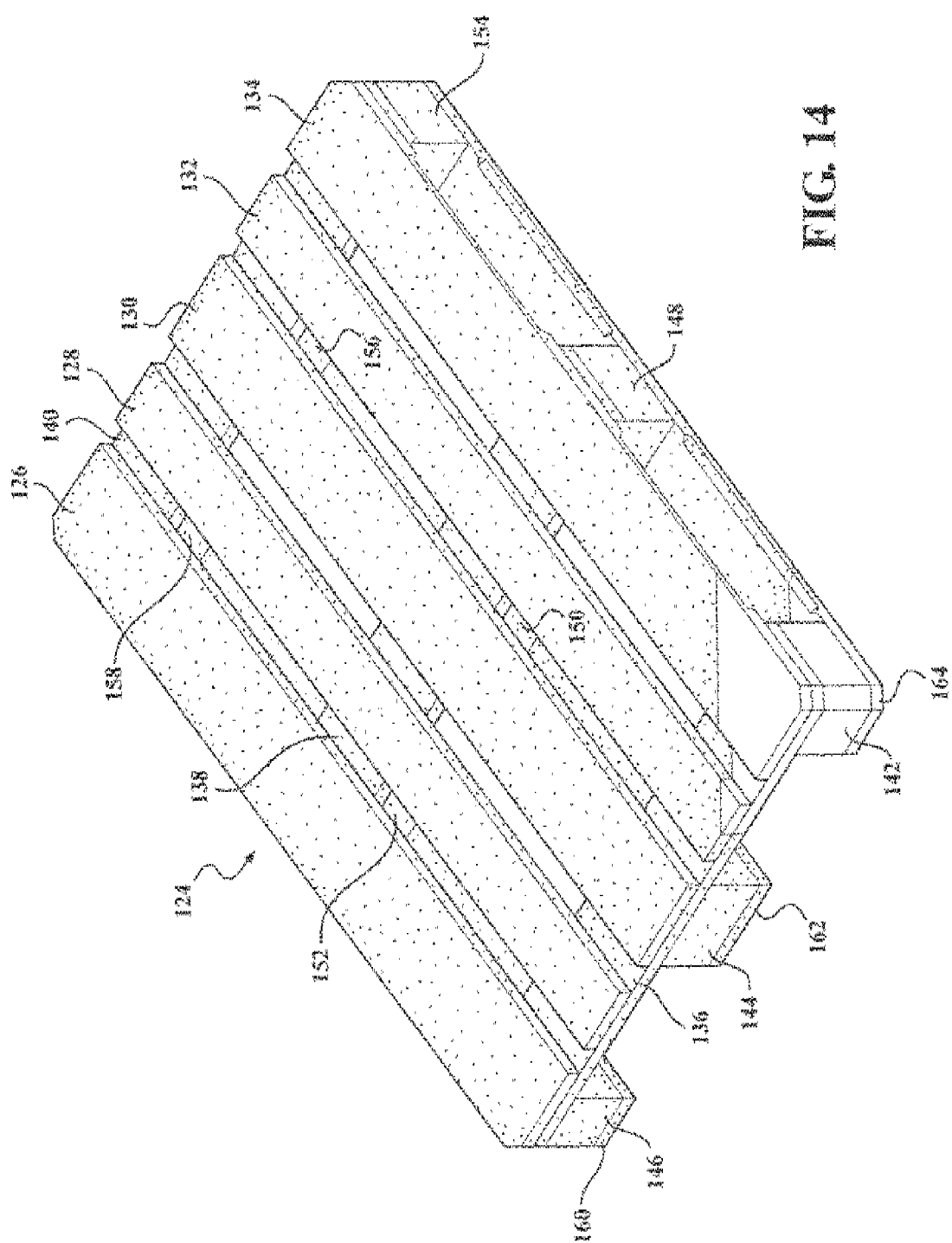

PALLET CONSTRUCTION WITH MULTI SURFACE BONDING PLASTICIZED SPRAY

CROSS REFERENCE TO RELATED APPLICATIONS

The present invention claims priority from U.S. Ser. No. 61/414,772 filed Apr. 13, 2011.

FIELD OF THE INVENTION

The present invention discloses a variety of pallet designs incorporating any of a variety of unitary or composite materials, not limited to wood, steel, aluminum, bamboo, plastic, cardboard, foam and concrete, and which combines a universally bondable plastic spray over coating for providing a durable and environmentally resistant article.

DESCRIPTION OF THE BACKGROUND ART

The prior art is well documented with examples of pallet assemblies such as which typically are constructed of cross wise extending lengths of wood or other suitable materials which are nailed or otherwise adhered together in such a fashion in order to provide an elevated load bearing surface. A problem with existing pallet assemblies is the tendency of the wood or other structural material to degrade as a result of moisture permeation, resulting in marked reduction in useful life and performance.

SUMMARY OF THE PRESENT INVENTION

The present invention discloses a pallet construction including a plurality of elongate extending, and inter-engaging members establishing three dimensional construction with an upper platform supporting surface and a spaced apart and bottom ground supporting surface. A plasticized and environmentally sealing spray overcoat is applied over the members.

Additional variants include a plurality of three dimensional, and rectangular shaped support elements sandwiched between a first upper plurality of elongated members and a second plurality of lower members. A plurality of inter-engaging and overlapping locations include at least one of reduced thickness or notched locations in order to assemble into a seamless and constant width manner. The members can further exhibit any specified shape and size and can be constructed of any of a wood, steel, aluminum, bamboo, composite plastic, cardboard, foam or concrete/silicate based material.

BRIEF DESCRIPTION OF THE DRAWINGS

Reference will now be made to the attached drawings, when read in combination with the following detailed description, wherein like reference numerals refer to like parts throughout the several views, and in which:

FIG. 6 is a rotated underside perspective of the pallet shown in FIG. 5;

FIG. 12 is a rotated underside perspective of the pallet in FIG. 11 and better exhibiting the plurality of three parallel extending bottom slats without additional cross bracing;

FIG. 14 is an upper perspective of a Euro pallet design according to a still further embodiment;

DETAILED DESCRIPTION OF THE PREFERRED EMBODIMENTS

Referring now to the attached illustrations, the present invention discloses a variety of pallet designs incorporating any of wood, steel, aluminum or bamboo materials, and which combines a universally bondable plastic spray over coating for providing a durable and environmentally resistant article. The pallet configurations and materials described herein are intended to present a non-limiting selection of possible designs and it is further envisioned that other shapes and assemblies can be substituted.

Figure 1A:
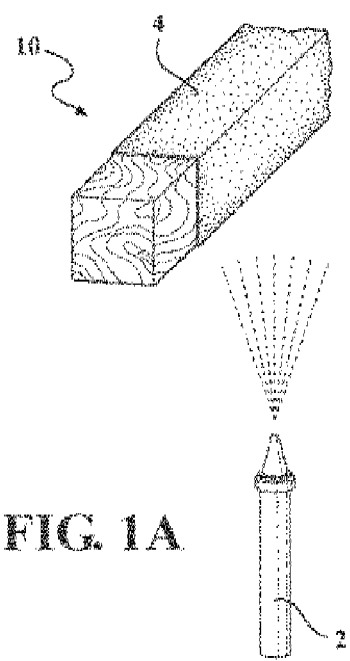
FIGS. 1A-1D depict an external plasticized spray applied over each of wood, steel, aluminum and bamboo core materials.
Figure 1B:
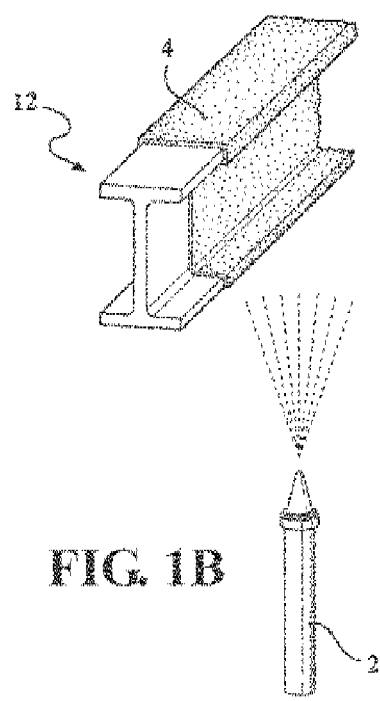
Figure 1C:
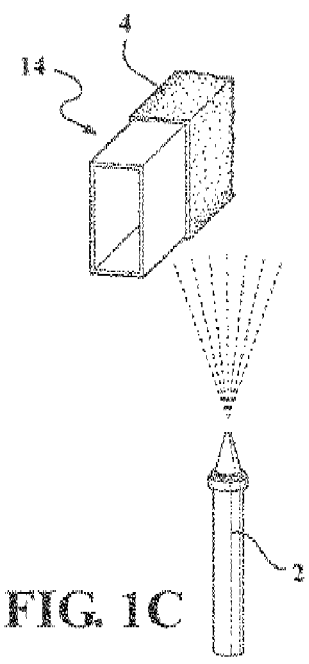
Figure 1D:
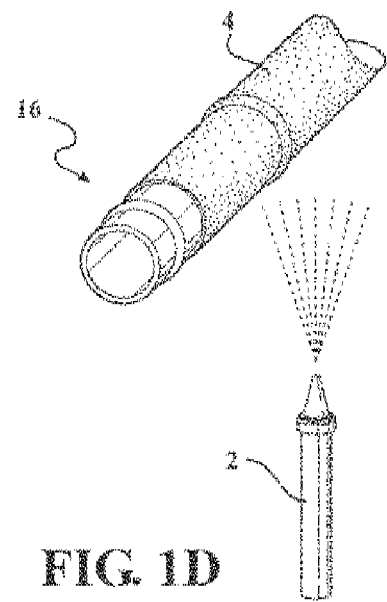

The above said, FIGS. 1A-1D depict a series of applications 10, 12, 14 and 16, respectively, of an external plasticized spray (collectively referenced by nozzle 2 for applying a coating 4) and applied over each of wood, steel, aluminum and bamboo core materials, respectively. As shown, the materials can exhibit any cross sectional shape or size including such, as solid wood rectangular (beam) cross section. (FIG. 1A), steel I-beam (FIG. 1B), hollow tubular aluminum rectangular member (FIG. 5C) and bamboo circular cross sectional member (FIG. 1D).

Figure 2A:
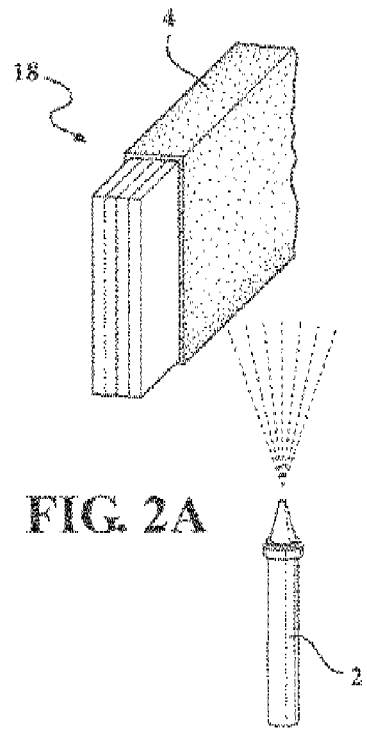
FIGS. 2A-2D depict the plasticized spray applied over a variety of plasticized composite, cardboard, foam and concrete materials.
Figure 2B:
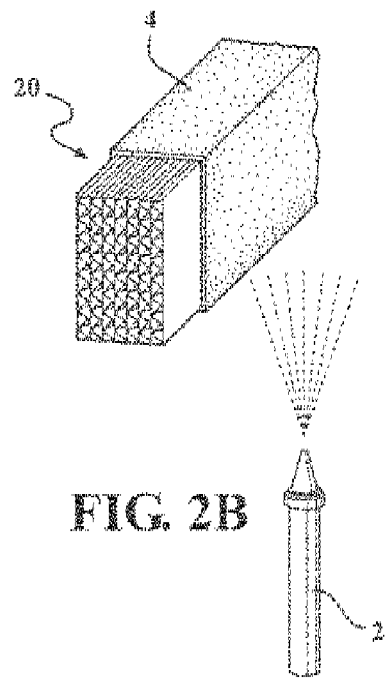
Figure 2C:
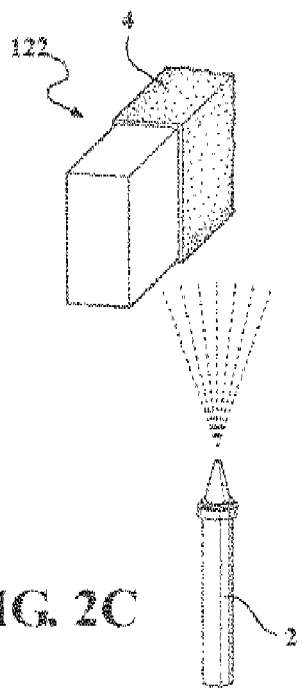
Figure 2D:
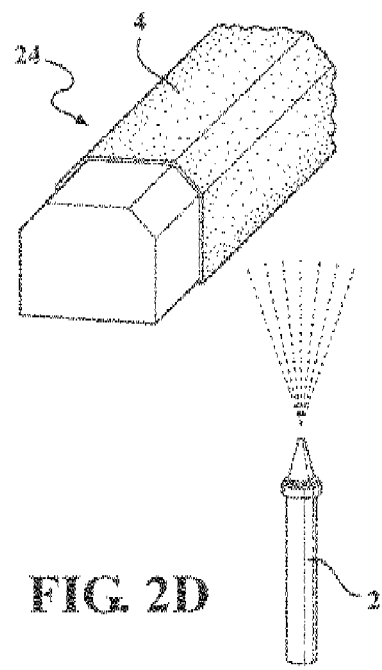

FIGS. 2A-2D illustrate a series of sandwiched and irregular shaped articles, each depicting the plasticized spray applied over a variety of plasticized composite 18 (or multi layer sandwiched material as shown in FIG. 2A), corrugated cardboard material 20 (shown, in FIG. 2B and illustrating such as a multi ply construction), foam 22 (or other expanded poly based material as shown in FIG. 2C) and concrete (or like silicate based) 24 materials (such as exhibiting a modified trapezoidal shape depicted in FIG. 2D). The purpose of FIGS. 1 and 2 is to demonstrate the unlimited variety of articles to which the plasticized spray composition (and which can include a suitable polymeric recipe along with a desired foaming/bonding agent) can be applied in a universally bonding fashion, to a wide variety of materials.

Figure 3:
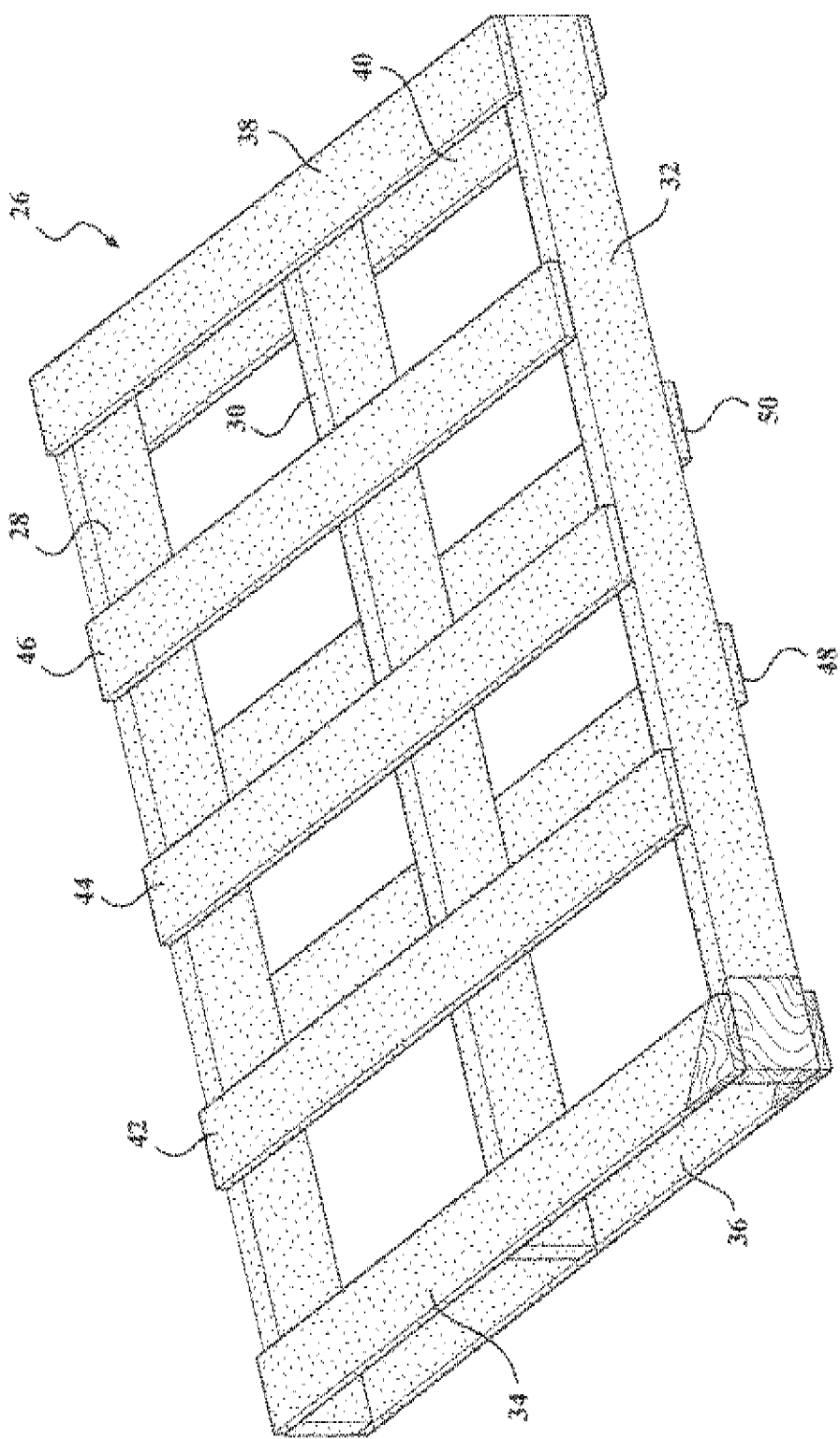
FIG. 3 is a perspective depiction of a wooden pallet exhibiting one configuration and over which is applied a highly bondable and environmentally sealing plasticized spray.

Referring now to FIG. 3, a perspective depiction at 26 of a wooden pallet exhibiting one configuration including a plurality of three linear extending members 28, 30, 32 which are interconnected by upper and lower pairs 34 & 36 and 38 & 40 of cross extending end members. The linear extending and cross end extending members can include any suitable planking dimensions, such as 2×4, 2×6 or the like.

Additional intermediate cross extending members are provided along both upper and lower surfaces of the linear members 28, 30 and 32 and include upper cross members 42, 44 and 46 (positioned in parallel spaced fashion between upper and cross members 34 and 38) as well as lower cross members 48 and 50 (positioned in parallel spaced fashion between lower end cross members 36 and 40). The upper and lower end cross members 34, 36, 38 and 40 as well as upper 42, 44, 46 and lower 48 and 50 intermediate cross members are typically narrowed slat shaped members (such as 1×6 planking).

The pallet is further show with a plasticized spray coating having been pre-applied with the exception of an exposed corner location associated with linear member 32 and upper/lower end cross members 34 and 36. As previously described, the spray coating provides environmentally sealing of the pallet members. In the particular instance of wooden planking, the use of durable plasticized spray coat retards the admittance of water and mold within the cellulosic structure of the wood, this otherwise degrading the load carrying capabilities of the pallet along with increasing its overall weight.

Figure 4:
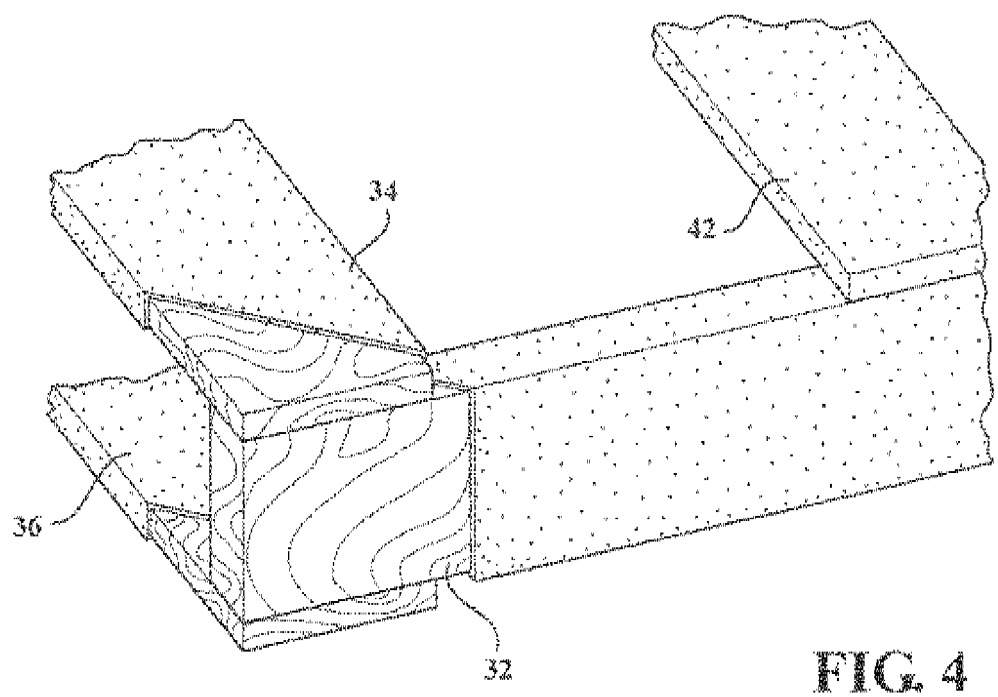
FIG. 4 is an enlarged corner depiction of the pallet shown in FIG. 3 and which better depicts the application of the over spray coat.

FIG. 4 is an enlarged corner depiction of the pallet shown in FIG. 3 and which better depicts the application of the over spray coat. In particular, the relative thickness application of me spray coat, which can range form a few mils up to 1/16" or greater, is better depicted.

Figure 5:
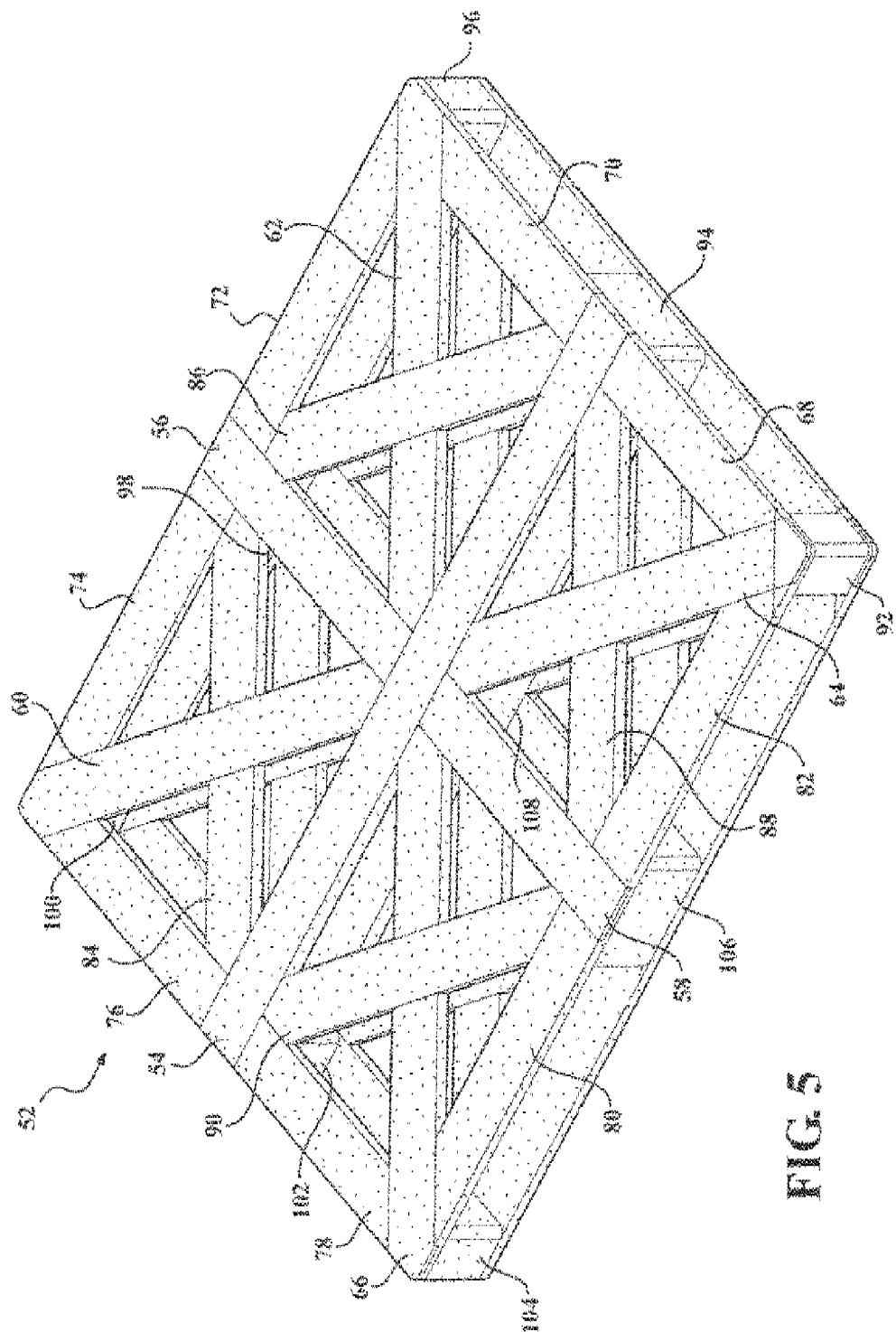
FIG. 5 is a perspective view of a further configuration of wooden pallet with environmental spray overcoat.

Referring now to FIG. 5, a perspective view 52 is shown of a further configuration of wooden pallet with environmental spray overcoat. The variant 52 differs from that shown in FIG. 3 in that combined superimposed cross and "X" shaped portions are provided in identical upper and lower surfaces. Specifically, crows shaped portion 54 and 56/58 are superimposed with inner diagonal and collectively X shaped portions 60, 62, 64 and 66 as depicted.

Additional outer perimeter portions 68, 70, 72, 74, 76, 73, 80 and 82 extend in pairs along each of respective foot sides of the upper pallet surface. In combination, with the diagonal portions 60, 62, 64 and 66, additional sub-cross members are respectively indicated at 84, 86, 88 and 90. In this fashion, individual pluralities of upper and lower elongate interconnecting members establish upper and lower layers.

Figure 7:
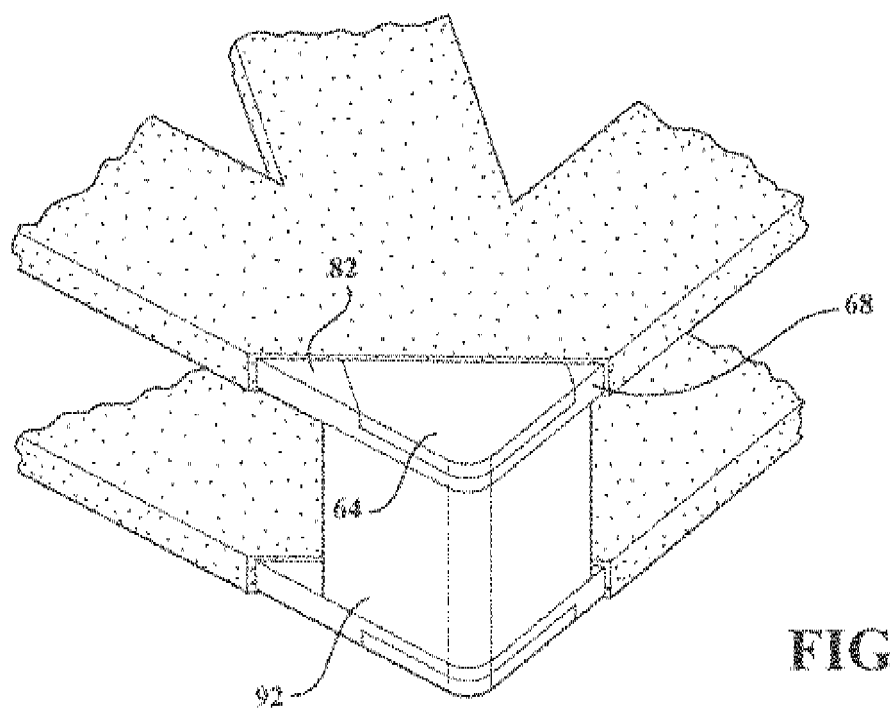
FIG. 7 is an enlarged partial illustration illustrating a corner profile in which overlapping end portions exhibit reduced thicknesses for establishing a seamless appearance.

As further shown, the overlapping seam or joint locations established by the various members 54-90 include both, angling/beveling the edge locations of the various members, combined with suitable notching or edging of overlapping joints so as to establish a constant thickness seamless appearance. This is best shown by example in the enlarged partial illustration of FIG. 7 and referring to the reduced thickness and seamless edge profile established, between sections 64, 68 and 82.

FIG. 6 is a rotated underside perspective of the pallet 52 shown in FIG. 5 and such that a substantially identical configuration of portions (compared to 54-90) is again illustrated such that a repetitive description is unnecessary. The variant 52 further includes a plurality of three dimensional shaped rectangular portions placed at midpoint and corner locations along the outer perimeter of the pallet, see at 92, 94, 96, 98, 100, 102, 104 and 106, and combined, with a single central located, inner sandwiched three dimensional rectangular portion 108, these providing structural support to the pallet 52 and by virtue of separating the upper and lower layers each again respectively defined by the individual pluralities of interconnecting elongate members.

As with the previous embodiment, the pallet members can be assembled using nails, screw, as well as alternatively through, the application of chemical or other bonding adhesives. The over-application of the durable spray coat farther compensates for any weaker or less robust fastener arrangement employed in securing together the various planking members and serves to maintain the integrity of the pallet over its useful life.

Figure 8:
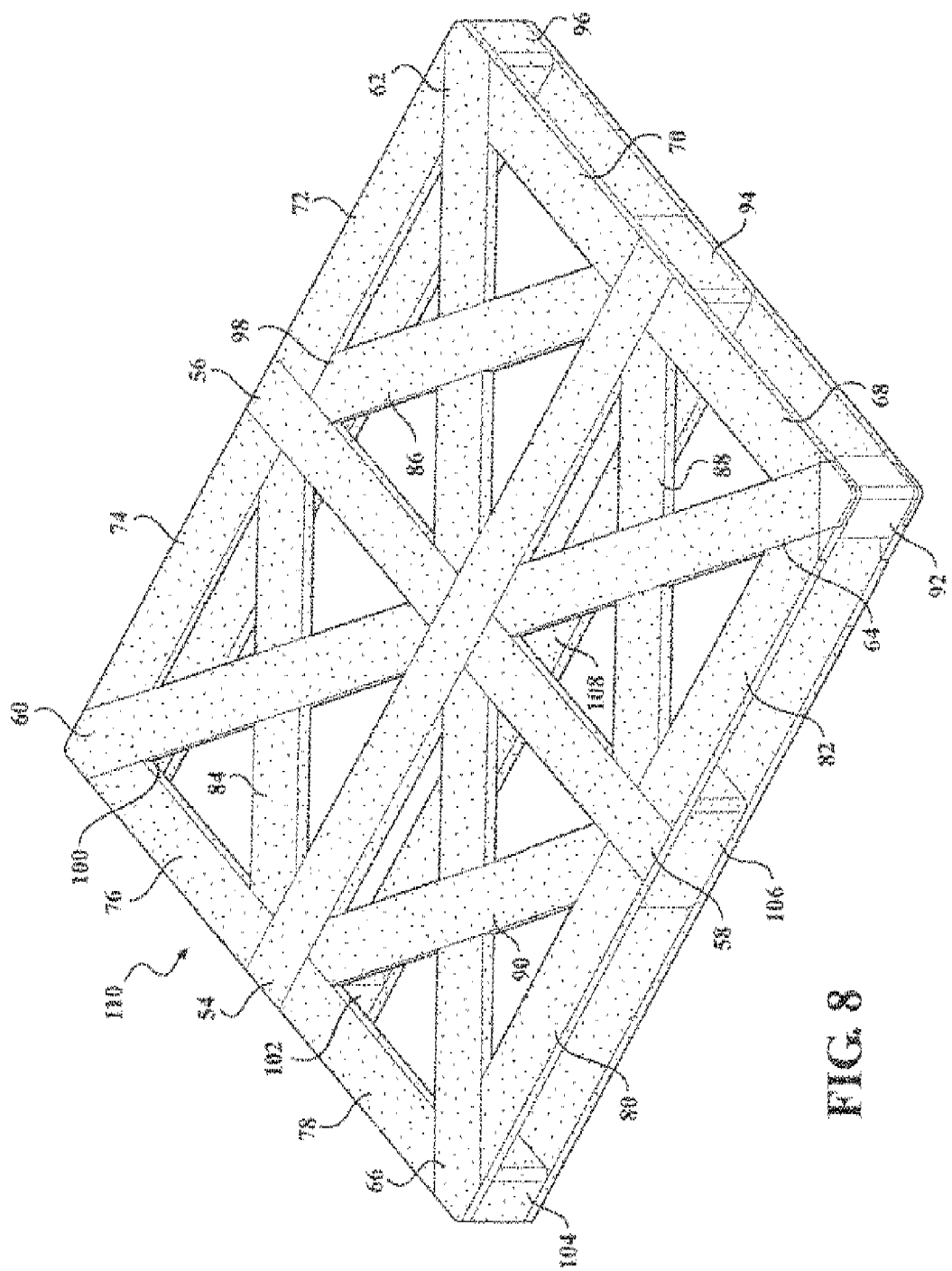
FIG. 8 is a perspective of a still further configuration of wooden pallet based upon the design of FIG. 5 and with selected bracing members removed.

Referring now to FIG. 8 is a perspective of a still further configuration 110 of wooden pallet based upon the design of FIG. 5 and with selected bracing members removed from the underside. Specifically, interconnecting portions 54-90 are repeated as shown in FIG. 5, however, referring further to FIG. 9 in comparison to FIG. 6, a selected sub-plurality of cross members are removed leaving a reduced plurality of linear extending members 112, 114, 116 and end cross members 118 and 120.

Figure 9:
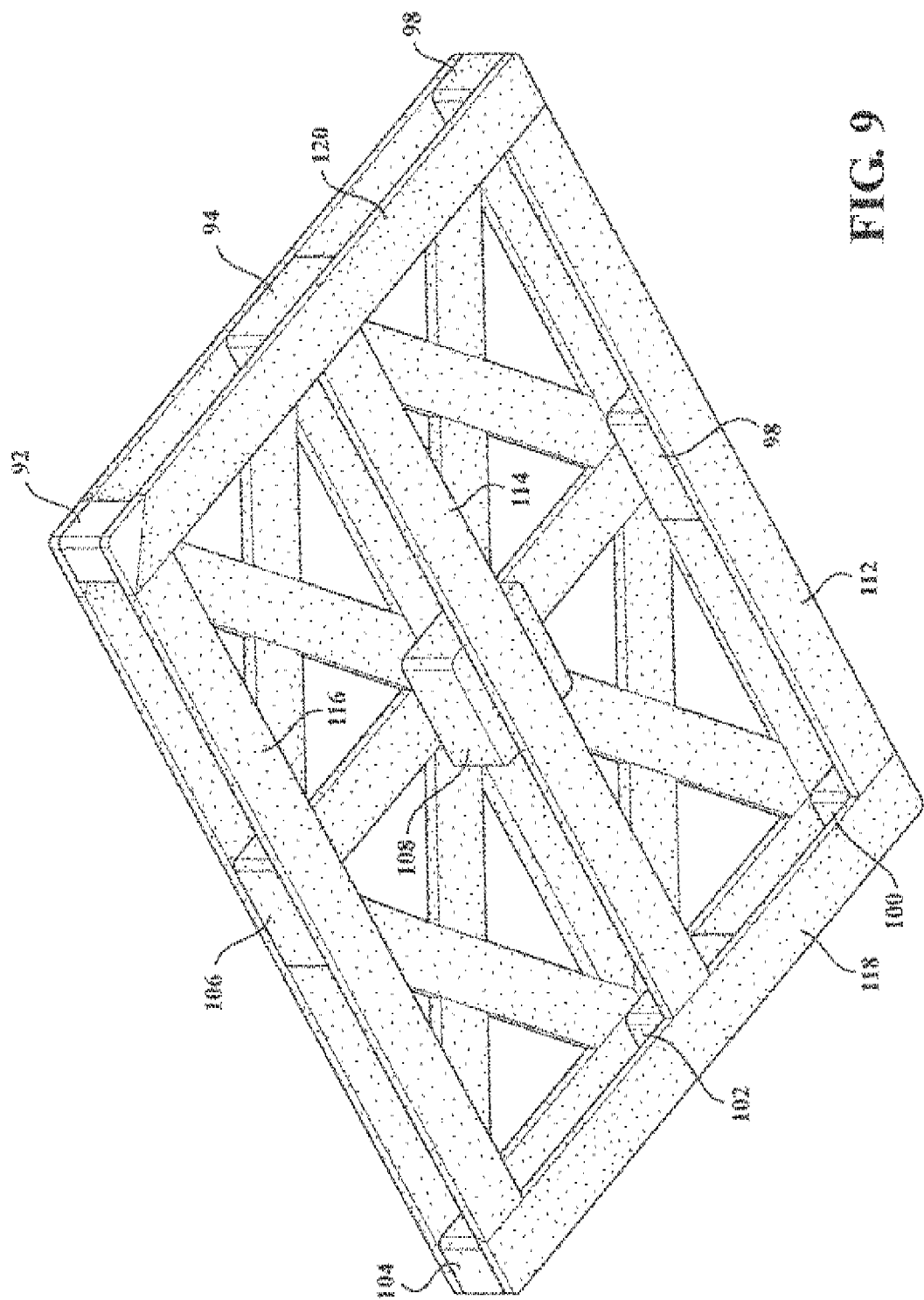
FIG. 9 is a rotated underside perspective of the pallet in FIG. 8.
Figure 10:
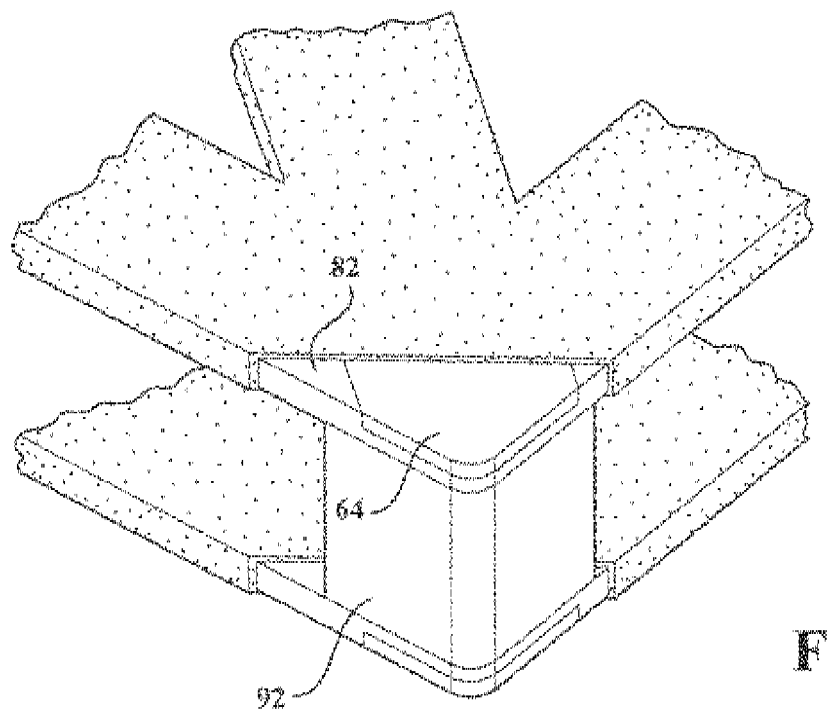
FIG. 10 is an enlarged partial illustration of a corner profile of the pallet and similar to that shown in FIG. 7.

Rectangular three dimensional support portions are again depicted at 92-108 as previously described and the underside view of FIG. 9, for purposes of case of illustration, does not include the reference numerals 54-90 shown in FIG. 8. FIG. 10 again presents an enlarged partial illustration of a corner profile of the pallet and similar to that shown in FIG. 7.

Figure 13:
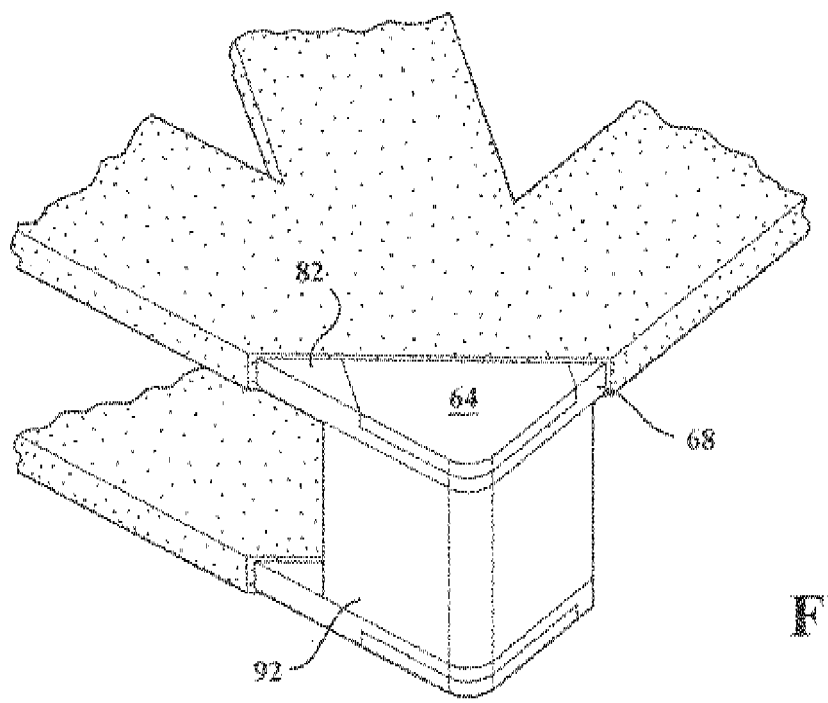
FIG. 13 is an enlarged partial illustration of a corner profile of the pallet in FIG. 11 similar to prior FIGS. 7 and 10.
Figure 11:
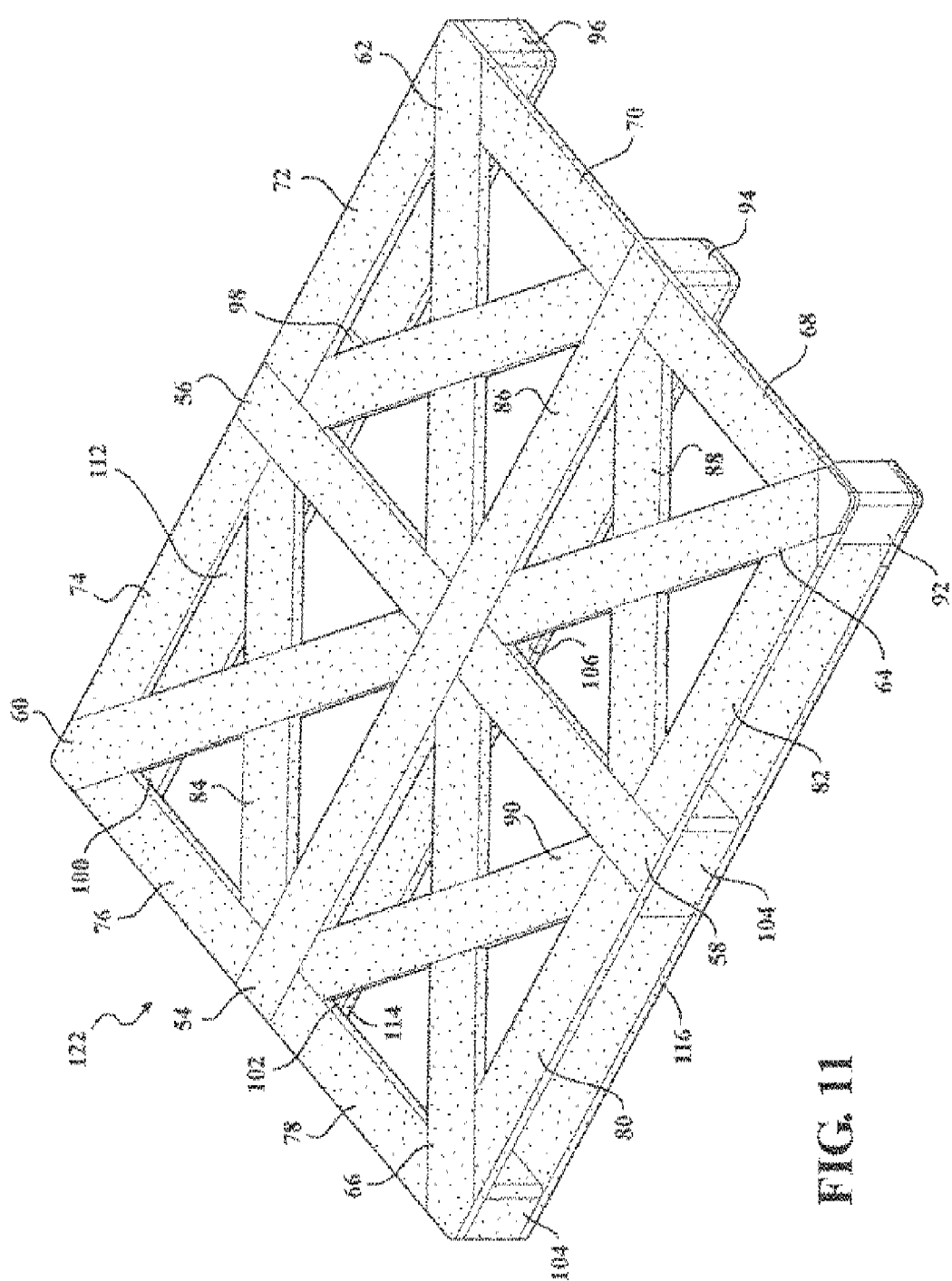
FIG. 11 is a top perspective illustration, of a further configuration of the pallet exhibit combined "X" and cross shapes components.

Proceeding to FIG. 11, a top perspective illustration is shown at 122 of a further configuration of the pallet exhibit combined "X" and cross shapes components and which again repeats the arrangement of planking portions 54-60 depicted in each of FIGS. 5 and 8. The underside view of succeeding FIG. 12 (in comparison to corresponding underside FIG. 9 in relation to preceding FIG. 8) again exhibits the three parallel extending bottom slats 112, 114 and 116 without additional cross bracing. FIG. 13 is an enlarged partial illustration of a corner profile of the pallet in FIG. 11, again similar to prior FIGS. 7 and 10;

Finally, FIG. 14 presents an upper perspective illustration, at 124 of a Euro pallet design according to a still farther embodiment and which includes parallel upper slats 126, 128, 130, 132 and 134 and cross slats 136, 138 and 140 collectively defining an upper surface layer. Three rows of structural rectangular and three dimensional portions are provided, at 142, 144, 146, 148, 150, 152, 154, 156 and 158 and interconnect three bottom parallel extending (lengthwise) slats 160, 162 and 164.

Figure 15:
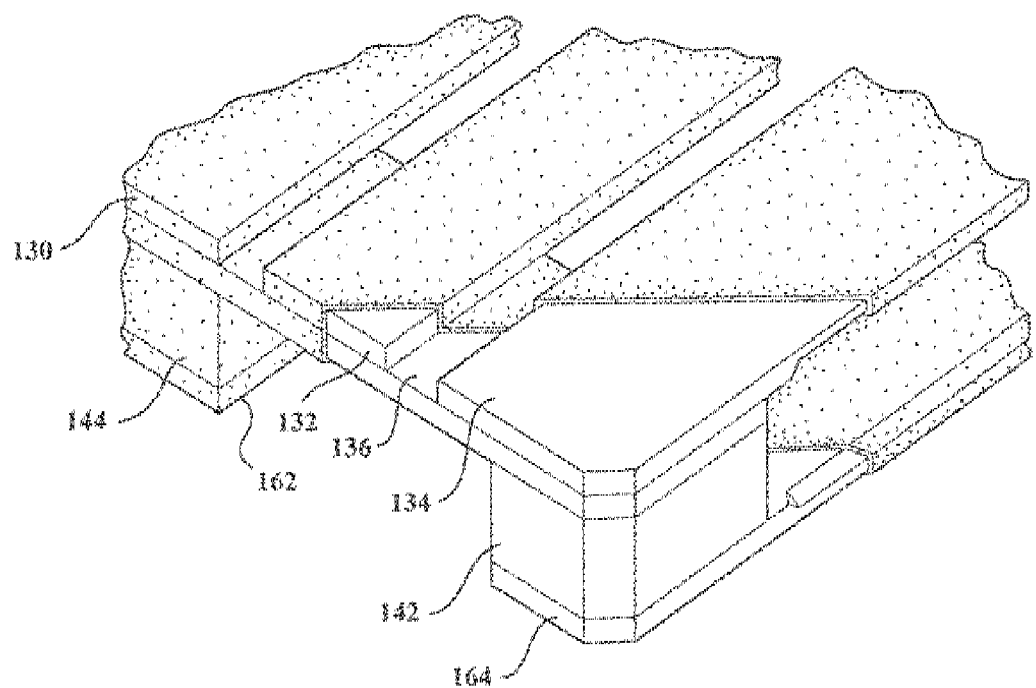
FIG. 15 is an enlarged perspective of the pallet design of FIG. 14 and further depicting mating arrangement between the upper, lower and crosswise extending pieces.
Figure 16:
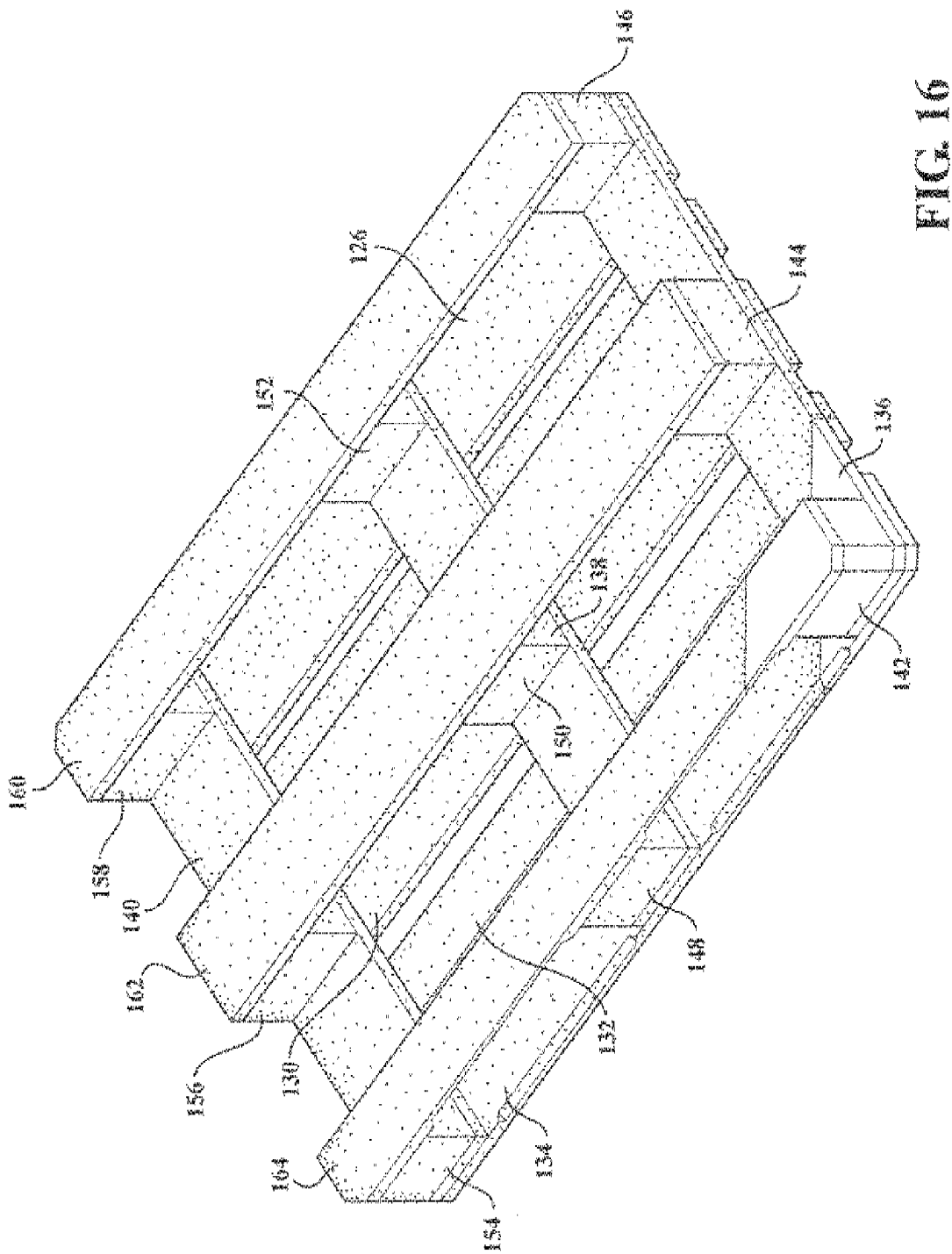
FIG. 16 is a rotated underside perspective of the pallet in FIG. 14 and illustrating a like variation of three parallel extending bottom slats similar to the variant shown in FIG. 12.

FIG. 15 is an enlarged perspective of the pallet design of FIG. 14 and further depicts mating arrangement between the upper, lower and crosswise extending pieces. FIG. 16 finally depicts a rotated underside perspective of the pallet in FIG. 14 and illustrating a like variation of three parallel extending bottom slats similar to the variant shown in FIG. 12.

As with the previously described variants, the Euro pallet design can exhibit any specified dimensions, however one known standard provides such pallets in a sizing of 800 mm×1200 mm. Beyond the wood material disclosed, it is again understood that any suitable material construction or configuration can be employed within the scope of the invention. Also, the use and application of the plastic spray overcoat is depleted in each of the variants and the potential range of its application and material recipe is also unlimited.

Having described my invention, other and additional preferred embodiments will become apparent to those skilled in the art to which it pertains and without deviating from the scope of the appended claims.

I claim:

1. A coated pallet construction, comprising:
 a three dimensional body constructed of a first plurality of elongate extending and inter-engaging members establishing an upper layer;
 a second plurality of elongate extending and inter-engaging members establishing a lower layer;
 at least said upper layer including outer perimeter defining members arranged in a rectangular shape, cross shaped members extending between said outer perimeter defining members to subdivide said upper layer into four quadrants, additional interior elongate members arranged in "X" shaped portions within each quadrant;
 corner surfaces of each of said outer perimeter defining members having angled grooves defined therein, said cross members having end extending and overlapping tongues of reduced thickness seating within said grooves to establish a seamless surface appearance;
 additional tongue and groove arrangements established between overlapping locations defined by said interior elongate members arranged in said "X" shaped portions within each quadrant;
 a further plurality of spacer components at locations between said upper and lower layers in order to establish three dimensional construction with an upper platform supporting surface and a spaced apart and bottom ground supporting surface; and
 a plasticized and environmentally sealing spray overcoat applied over said members.

2. The pallet of claim 1, said members having a specified shape and size and further comprising any of a wood, steel, aluminum, bamboo, composite plastic, cardboard, foam or concrete/silicate based material.

3. A coated pallet construction, comprising:
 a three dimensional body constructed of a first plurality of elongate extending and inter-engaging members establishing an upper layer;
 a second plurality of elongate extending and inter-engaging members establishing a lower layer;
 each of said upper and lower layers including outer perimeter defining members arranged in a rectangular shape, cross shaped members extending between said outer perimeter defining members to subdivide said upper layer into four quadrants, additional interior elongate members arranged in "X" shaped portions within each quadrant;
 corner surfaces of each of said outer perimeter defining members having angled grooves defined therein, said cross members having end extending and overlapping tongues of reduced thickness seating within said grooves to establish a seamless surface appearance;
 additional tongue and groove arrangements established between overlapping locations defined by said interior elongate members arranged in said "X" shaped portions within each quadrant;
 a plurality of three dimensional rectangular shaped spacer components interposed between said upper and lower layers in order to establish three dimensional construction such that said upper layer defines a platform supporting surface and said lower layer a ground supporting surface; and
 a plasticized and environmentally sealing spray overcoat applied over said members.

4. The pallet as described in claim 3, further comprising a central located spacer component arranged within said body between said upper and lower layers, additional spacer components arranged at spaced locations along each perimeter edge of said body.

5. The pallet as described in claim 3, said members having a specified shape and size and further comprising any of a wood, steel, aluminum, bamboo, composite plastic, cardboard, foam or concrete/silicate based material.

* * * * *